United States Patent
Tanaka et al.

(10) Patent No.: US 7,757,474 B2
(45) Date of Patent: Jul. 20, 2010

(54) GAS TURBINE PROTECTION DEVICE

(75) Inventors: Satoshi Tanaka, Takasago (JP);
Toshimitsu Morimoto, Takasago (JP);
Shouichi Nagata, Takasago (JP); Kozo Toyama, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 860 days.

(21) Appl. No.: 10/581,194

(22) PCT Filed: Nov. 26, 2004

(86) PCT No.: PCT/JP2004/017560

§ 371 (c)(1),
(2), (4) Date: Jan. 12, 2007

(87) PCT Pub. No.: WO2005/054646

PCT Pub. Date: Jun. 16, 2005

(65) Prior Publication Data

US 2008/0276595 A1  Nov. 13, 2008

(30) Foreign Application Priority Data

Dec. 2, 2003  (JP) .............................. 2003-402473

(51) Int. Cl.
*F02G 3/00* (2006.01)

(52) U.S. Cl. ..................................... 60/39.091; 60/773

(58) Field of Classification Search .............. 60/39.091, 60/39.281, 773; 73/112.01, 112.03; 702/130, 702/132, 183–185

See application file for complete search history.

(56) References Cited

U.S. PATENT DOCUMENTS

| 5,461,855 | A | 10/1995 | Inoue et al. | |
| 6,782,691 | B2* | 8/2004 | Nagata et al. | 60/39.091 |
| 6,868,663 | B2* | 3/2005 | Nagata et al. | 60/39.091 |
| 2002/0149485 | A1 | 10/2002 | Nagata et al. | |
| 2005/0204745 | A1* | 9/2005 | Hirayama et al. | 60/773 |

FOREIGN PATENT DOCUMENTS

| CA | 2 376 582 A1 | 10/2002 |
| DE | 691 08 525 B1 | 8/1995 |

(Continued)

*Primary Examiner*—Michael Cuff
*Assistant Examiner*—Phutthiwat Wongwian
(74) *Attorney, Agent, or Firm*—Birch, Stewart, Kolasch & Birch LLP (57) ABSTRACT

A gas turbine has a plurality of combustors in a toroidal arrangement to provide combustion gases to turbine blades, thereby rotating the turbine body. Thermocouples, the number of which is the same as or greater than the number of the combustors, are arranged toroidally at the outlets of the turbine blades and measure the temperatures of the combustion gases at the respective outlets. During the operation of the gas turbine, if an abnormality, such as misfire or fuel injection nozzle obstruction, occurs in one or more of the combustors, the resulting change in gas temperature triggers a signal to stop, and thereby protect the gas turbine. Based on the measured values of the blade pass temperatures of the thermocouples and set threshold temperatures, a fuel supply system may be caused to gradually decrease the fuel supplied to the combustors to bring the gas turbine body to an automatic stop, or it may be cut off instantaneously, thus immediately stopping the gas turbine.

11 Claims, 6 Drawing Sheets

FOREIGN PATENT DOCUMENTS

| | | |
|---|---|---|
| EP | 0 488 766 A1 | 6/1992 |
| EP | 1 251 258 A2 | 10/2002 |
| JP | 63-248903 A | 10/1988 |
| JP | 1-240739 A | 9/1989 |
| JP | 4-203808 A | 7/1992 |
| JP | 6-264761 A | 9/1994 |
| JP | 8-110050 A | 4/1996 |
| JP | 2002-221048 A | 8/2002 |
| JP | 2002-309963 A | 10/2002 |

* cited by examiner

GAS TURBINE PROTECTION DEVICE

TECHNICAL FIELD

This invention relates to a gas turbine protection apparatus.

BACKGROUND ART

A gas turbine has a plurality of combustors disposed in a toroidal form, and is arranged to flow combustion gases of these combustors to turbine blade (stationary blade and moving blade) portions of a turbine body, thereby rotating the turbine body. During the operation of the gas turbine, all the combustors need to act normally.

During the operation of the gas turbine, therefore, it is necessary to keep watch on whether an abnormality, such as misfire or fuel injection nozzle obstruction, occurs or not in one or more of the combustors. If it is judged that the abnormality has occurred in the combustor, it is necessary to effect automatic stop or tripping of the gas turbine, thereby protecting the gas turbine.

For this purpose, thermocouples, the number of which is the same as or larger than the number of the combustors, are arranged toroidally at the outlets of the turbine blades (downstream in the flowing direction of the combustion gases) (see FIGS. 1(a), 1(b); details to be offered later), and these thermocouples measure the temperatures of the combustion gases at the outlets of the turbine blades (blade pass temperatures). Based on the measured values of the blade pass temperatures of the thermocouples, a gas turbine protection apparatus outputs a gas turbine automatic stop signal or a gas turbine tripping signal as a gas turbine protection signal. If the gas turbine automatic stop signal is outputted from the gas turbine protection apparatus, a fuel supply system gradually decreases a fuel to be supplied to the combustors to reduce a load, thereby bringing the gas turbine body to an automatic stop. If the gas turbine tripping signal is outputted from the gas turbine protection apparatus, the fuel supply system instantaneously cuts off fuel supply to the combustors, tripping (urgently stopping) the gas turbine.

If an abnormality occurs in any one of the combustors, only the blade pass temperature corresponding to the abnormal combustor has a great deviation (difference from the average value) or a large deviation change amount (change rate) in comparison with the blade pass temperatures corresponding to the other combustors. Thus, the abnormality of the abnormal combustor can be detected. Hence, the gas turbine protection apparatus has an interlock logic which outputs the gas turbine automatic stop signal or the gas turbine tripping signal when the blade pass temperature deviation obtained from the blade pass temperature measured value of any of the thermocouples has exceeded a blade pass temperature deviation great set value, or when the change amount of the blade pass temperature deviation has exceeded a blade pass temperature deviation change amount large set value.

The blade pass temperature of the combustion gas of each combustor is not measured at the turbine blade outlet position corresponding to each combustor, but is measured at the turbine blade outlet position at an angle displaced from each combustor in the rotating direction of the turbine body and in the circumferential direction by several of the combustors. This displacement for the blade pass temperature is called a swirl angle and, for example, is equivalent to 2.7 of the combustors, although it differs according to the magnitude of the load. If the swirl angle is equivalent to 2.7 of the combustors, the blade pass temperature of the combustion gas of the abnormal combustor is measured not by the thermocouple disposed at the turbine blade outlet position corresponding to the abnormal combustor, but by the thermocouple disposed at the turbine blade outlet position displaced from the former thermocouple in the circumferential direction by the equivalent of 2 or 3 of the combustors.

Patent Document 1 discloses an example in which the blade pass temperature of a combustion gas of a combustor was measured by a thermocouple disposed at a turbine blade outlet, and the measured value of the blade pass temperature of this thermocouple was used for gas turbine control.

Patent Document 1: Japanese Patent Application Laid-Open No. 1994-264761

DISCLOSURE OF THE INVENTION

Problems to be Solved by the Invention

With the above-described conventional turbine protection apparatus, however, if the combustor becomes abnormal, the turbine body can reliably be stopped automatically or tripped for protection. If the thermocouple becomes abnormal, however, the turbine body may accidentally be stopped automatically or tripped. That is, if the measured value of the blade pass temperature of the thermocouple becomes abnormal because a protective tube (sheath) for the thermocouple is shaved, faulty insulation occurs between the constituent wires of the thermocouple, or a fixture for the thermocouple loosens to displace the measurement point from the normal position, the interlock of the gas turbine protection apparatus may accidentally work, thereby automatically stopping or tripping the turbine body.

As a measure against this accident, there is a method comprising installing the thermocouples, the number of which is three times the number of the combustors, selecting the intermediate value of the measured values of the blade pass temperatures of the three thermocouples, and operating the aforementioned interlock. However, mounting of the thermocouples, whose number is as large as three times the number of the combustors, at the outlets of the turbine blades is impossible in terms of a place of mounting. Even if the place of mounting can be secured, such mounting involves a considerable cost.

The present invention has been accomplished in the light of the above-described circumstances. It is an object of the invention to provide a gas turbine protection apparatus which can output a gas turbine protection signal (automatic stop signal, tripping signal) only when a combustor is abnormal, without increasing the number of temperature sensors such as thermocouples.

Means for Solving the Problems

If an abnormality occurs in any of the combustors, there is no case where the blade pass temperature measured value of one thermocouple changes, but no changes are observed in the blade pass temperature measured values of other thermocouples. At least, the blade pass temperature measure value of the thermocouple adjacent to the one thermocouple necessarily shows a change. For example, if the swirl angle is equivalent to 2.7 of the combustors, changes occur in the blade pass temperature measured value of the thermocouple at the position displaced by two of the combustors from the thermocouple at the position corresponding to the abnormal combustor, and in the blade pass temperature measured value of the thermocouple at the position displaced by three of the combustors from the thermocouple at the position corresponding to the abnormal combustor. On the other hand, if there is no abnormality in the combustor, but an abnormality occurs in any of the thermocouples, only the blade pass temperature measured value of the abnormal thermocouple changes abnormally. The present invention has been made with particular attention to such findings, and has the following features.

That is, a gas turbine protection apparatus, as a first aspect of the invention for solving the above problems, is a gas turbine protection apparatus which measures the blade pass temperatures of combustion gases of a plurality of combustors arranged toroidally by temperature sensors at least equal in number to the number of the combustors and arranged toroidally at turbine blade outlets, and which outputs a gas turbine protection signal based on the blade pass temperature measured values of the temperature sensors, and comprising:

a temperature deviation computing section for computing a difference between the average value of the blade pass temperature measured values and the blade pass temperature measured value of each temperature sensor to find the blade pass temperature deviation of each temperature sensor;

a temperature deviation change amount computing section for computing the blade pass temperature deviation change amount of each temperature sensor based on the blade pass temperature deviation of each temperature sensor computed by the temperature deviation computing section;

a temperature deviation change amount large determining section for comparing the blade pass temperature deviation change amount of each temperature sensor computed by the temperature deviation change amount computing section with a blade pass temperature deviation change amount large set value to output a blade pass temperature deviation change amount large signal when the blade pass temperature deviation change amount of each temperature sensor exceeds the blade pass temperature deviation change amount large set value;

a temperature deviation change amount present determining section for comparing the blade pass temperature deviation change amount of each temperature sensor computed by the temperature deviation change amount computing section with a blade pass temperature deviation change amount present set value smaller than the blade pass temperature deviation change amount large set value to output a blade pass temperature deviation change amount present signal when the blade pass temperature deviation change amount of each temperature sensor exceeds the blade pass temperature deviation change amount present set value; and a protection signal outputting section for outputting the gas turbine protection signal when the blade pass temperature deviation change amount of any of the temperature sensors exceeds the blade pass temperature deviation change amount large set value, and the blade pass temperature deviation change amount large signal is outputted from the temperature deviation change amount large determining section, and when the blade pass temperature deviation change amount of any of the temperature sensors adjacent bilaterally to the any temperature sensor exceeds the blade pass temperature deviation change amount present set value, and the blade pass temperature deviation change amount present signal is outputted from the temperature deviation change amount present determining section.

A gas turbine protection apparatus, as a second aspect of the invention, is the gas turbine protection apparatus as the first aspect of the invention, characterized in that the protection signal outputting section includes a first off-delay timer section for delaying a time when the blade pass temperature deviation change amount large signal outputted from the temperature deviation change amount large determining section becomes OFF, and a second off-delay timer section for delaying a time when the blade pass temperature deviation change amount present signal outputted from the temperature deviation change amount present determining section becomes OFF.

A gas turbine protection apparatus, as a third aspect of the invention, is the gas turbine protection apparatus as the first or second aspect of the invention, characterized in that the protection signal outputting section also outputs the gas turbine protection signal when the blade pass temperature deviation change amount of any of the temperature sensors exceeds the blade pass temperature deviation change amount large set value, and the blade pass temperature deviation change amount large signal is outputted from the temperature deviation change amount large determining section, and when any of the temperature sensors adjacent bilaterally to the any temperature sensor has a value out of range.

A gas turbine protection apparatus, as a fourth aspect of the invention, is a gas turbine protection apparatus which measures the blade pass temperatures of combustion gases of a plurality of combustors arranged toroidally by temperature sensors at least equal in number to the number of the combustors and arranged toroidally at turbine blade outlets, and which outputs a gas turbine protection signal based on the blade pass temperature measured values of the temperature sensors, and comprising:

a temperature deviation computing section for computing a difference between the average value of the blade pass temperature measured values and the blade pass temperature measured value of each temperature sensor to find the blade pass temperature deviation of each temperature sensor;

a temperature deviation great determining section for comparing the blade pass temperature deviation of each temperature sensor computed by the temperature deviation computing section with a blade pass temperature deviation great set value to output a blade pass temperature deviation great signal when the blade pass temperature deviation of each temperature sensor exceeds the blade pass temperature deviation great set value;

a temperature deviation present determining section for comparing the blade pass temperature deviation of each temperature sensor computed by the temperature deviation computing section with a blade pass temperature deviation present set value smaller than the blade pass temperature deviation great set value to output a blade pass temperature deviation present signal when the blade pass temperature deviation of each temperature sensor exceeds the blade pass temperature deviation present set value; and a protection signal outputting section for outputting the gas turbine protection signal when the blade pass temperature deviation of any of the temperature sensors exceeds the blade pass temperature deviation great set value, and the blade pass temperature deviation great signal is outputted from the temperature deviation great determining section, and when the blade pass temperature deviation of any of the temperature sensors adjacent bilaterally to the any temperature sensor exceeds the blade pass temperature deviation present set value, and the blade pass temperature deviation present signal is outputted from the temperature deviation present determining section.

A gas turbine protection apparatus, as a fifth aspect of the invention, is the gas turbine protection apparatus as the fourth aspect of the invention, further comprising a temperature deviation change amount computing section for computing the blade pass temperature deviation change amount of each temperature sensor based on the blade pass temperature deviation computed by the temperature deviation computing section, and a temperature deviation change amount present determining section for comparing the blade pass temperature deviation change amount of each temperature sensor computed by the temperature deviation change amount computing section with a blade pass temperature deviation change amount present set value to output a blade pass temperature deviation change amount present signal when the blade pass temperature deviation change amount of each temperature sensor exceeds the blade pass temperature deviation change amount present set value, and characterized in that the protection signal outputting section also outputs the gas turbine protection signal when the blade pass temperature deviation of any of the temperature sensors exceeds the blade pass temperature deviation great set value, and the blade pass temperature deviation great signal is outputted from the temperature deviation great determining section, and when the blade pass temperature deviation change amount of any of the temperature sensors adjacent bilaterally to the any temperature sensor exceeds the blade pass temperature deviation change amount present set value, and the blade pass temperature deviation change amount present signal is outputted from the temperature deviation change amount present determining section.

A gas turbine protection apparatus, as a sixth aspect of the invention, is the gas turbine protection apparatus as the fourth or fifth aspect of the invention, characterized in that the protection signal outputting section includes an off-delay timer section for delaying a time when the blade pass temperature deviation change amount present signal outputted from the temperature deviation change amount present determining section becomes OFF.

A gas turbine protection apparatus, as a seventh aspect of the invention, is the gas turbine protection apparatus as the fourth, fifth or sixth aspect of the invention, characterized in that the protection signal outputting section also outputs the gas turbine protection signal when the blade pass temperature deviation of any of the temperature sensors exceeds the blade pass temperature deviation great set value, and the blade pass temperature deviation great signal is outputted from the temperature deviation great determining section, and when any of the temperature sensors adjacent bilaterally to the any temperature sensor has a value out of range.

EFFECTS OF THE INVENTION

According to the gas turbine protection apparatus as the first aspect of the invention, the gas turbine protection signal is outputted when the blade pass temperature deviation change amount of any of the temperature sensors exceeds the blade pass temperature deviation change amount large set value, and the blade pass temperature deviation change amount large signal is outputted from the temperature deviation change amount large determining section, and when the blade pass temperature deviation change amount of any of the temperature sensors adjacent bilaterally to the any temperature sensor exceeds the blade pass temperature deviation change amount present set value, and the blade pass temperature deviation change amount present signal is outputted from the temperature deviation change amount present determining section. Thus, if the temperature sensor becomes abnormal, accidental outputting of the gas turbine protection signal can be prevented without the need to increase the temperature sensors. Only when the combustor becomes abnormal, the gas turbine protection signal can be outputted to protect the turbine body. Hence, the gas turbine can be operated stably.

According to the gas turbine protection apparatus as the second aspect of the invention, there are provided the first off-delay timer section for delaying the time when the blade pass temperature deviation change amount large signal outputted from the temperature deviation change amount large determining section becomes OFF, and the second off-delay timer section for delaying the time when the blade pass temperature deviation change amount present signal outputted from the temperature deviation change amount present determining section becomes OFF. Thus, a discrepancy between the outputting timings for the blade pass temperature deviation change amount large signal and the blade pass temperature deviation change amount present signal can be prevented by the first off-delay timer section and the second off-delay timer section, so that the gas turbine protection signal can be outputted reliably.

According to the gas turbine protection apparatus as the third aspect of the invention, the gas turbine protection signal is also outputted when the blade pass temperature deviation change amount of any of the temperature sensors exceeds the blade pass temperature deviation change amount large set value, and the blade pass temperature deviation change amount large signal is outputted from the temperature deviation change amount large determining section, and when any of the temperature sensors adjacent bilaterally to the any temperature sensor has a value out of range. Thus, the gas turbine protection signal can also be outputted when the temperature sensors on both sides become so abnormal as to have values out of range, rendering determination impossible.

According to the gas turbine protection apparatus as the fourth aspect of the invention, the gas turbine protection signal is outputted when the blade pass temperature deviation of any of the temperature sensors exceeds the blade pass temperature deviation great set value, and the blade pass temperature deviation great signal is outputted from the temperature deviation great determining section, and when the blade pass temperature deviation of any of the temperature sensors adjacent bilaterally to the any temperature sensor exceeds the blade pass temperature deviation present set value, and the blade pass temperature deviation present signal is outputted from the temperature deviation present determining section. Thus, if the temperature sensor becomes abnormal, accidental outputting of the gas turbine protection signal can be prevented without the need to increase the temperature sensors. Only when the combustor becomes abnormal, the gas turbine protection signal can be outputted to protect the turbine body. Hence, the gas turbine can be operated stably.

According to the gas turbine protection apparatus as the fifth aspect of the invention, the gas turbine protection signal is also outputted when the blade pass temperature deviation of any of the temperature sensors exceeds the blade pass temperature deviation great set value, and the blade pass temperature deviation great signal is outputted from the temperature deviation great determining section, and when the blade pass temperature deviation change amount of any of the temperature sensors adjacent bilaterally to the any temperature sensor exceeds the blade pass temperature deviation change amount present set value, and the blade pass temperature deviation change amount present signal is outputted from the temperature deviation change amount present determining section. Thus, even when the blade pass temperature measured values of the temperature sensors located bilaterally adjacently are higher than the average value, the gas turbine protection signal can be outputted at an early stage.

According to the gas turbine protection apparatus as the sixth aspect of the invention, there is the off-delay timer section for delaying the time when the blade pass temperature deviation change amount present signal outputted from the temperature deviation change amount present determining section becomes OFF. Thus, this off-delay timer section can prevent the discrepancy in the outputting timing for the blade pass temperature deviation change amount present signal with respect to the blade pass temperature deviation great signal, so that the gas turbine protection signal can be outputted reliably.

According to the gas turbine protection apparatus as the seventh aspect of the invention, the gas turbine protection signal is also outputted when the blade pass temperature deviation of any of the temperature sensors exceeds the blade pass temperature deviation great set value, and the blade pass temperature deviation great signal is outputted from the temperature deviation great determining section, and when any of the temperature sensors adjacent bilaterally to the any temperature sensor has a value out of range. Thus, the gas turbine protection signal can also be outputted when the temperature sensors on both sides become so abnormal as to have values out of range, rendering determination impossible.

DESCRIPTION OF THE NUMERALS 1 gas turbine, 2 turbine body, 3a turbine blade (stationary blade), 3b turbine blade (moving blade), 4 combustor, 5 thermocouple, 6 gas turbine protection apparatus, 7 fuel supply system, 11a, 11b, 11c temperature deviation computing section, 12a, 12b, 12c temperature deviation change amount computing section, 13 dead time computing section, 14 subtracting section, 15 temperature deviation change amount large determining section, 16a, 16b temperature deviation change amount present determining section, 17 protection signal outputting section, 18a, 18b off-delay timer section, 19, 20, 21 OR logic section, 22 AND logic section, 23 OR logic section, 31 temperature deviation great determining section, 32a, 32b temperature deviation present determining section, 33 protection signal outputting section, 34a, 34b off-delay timer section, 35, 36, 37 OR logic section, 38 AND logic section, 39 0R logic section

BEST MODE FOR CARRYING OUT THE INVENTION

An embodiment of the present invention will now be described in detail based on the accompanying drawings.

Figure 1:
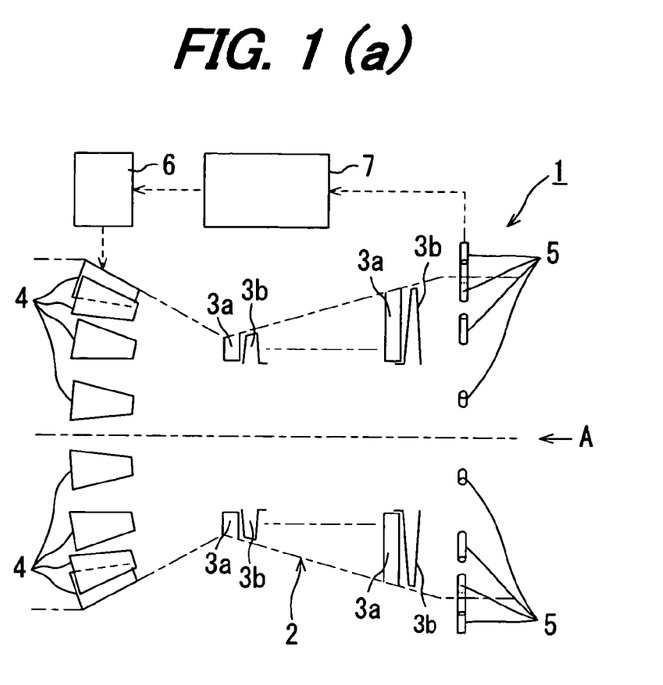
FIG. 1(a) is an outline view of a gas turbine equipped with a gas turbine protection apparatus according to an embodiment of the present invention.
FIG. 1(b) is an explanation drawing showing the positional relationship between combustors and thermocouples (a view taken in the direction of an arrow A in FIG. 1(a)).

As shown in FIGS. 1(a) and 1(b), a gas turbine 1 has a plurality of (14 in the illustrated example) combustors 4 at inlets (on an upstream side in a flowing direction of a combustion gas) of turbine blades (stationary blades, moving blades) 3a, 3b of a turbine body 3, and has a plurality of (14, the same number as the number of the combustors, in the illustrated example) thermocouples 5, as temperature sensors, at outlets (on a downstream side in the flowing direction of the combustion gas) of the turbine blades 3a, 3b. The blade pass temperature (hereinafter referred to as BPT) measurement signals of these thermocouples 5 are inputted into a gas turbine protection apparatus 7.

Based on the BPT measurement signals, the gas turbine protection apparatus 7 outputs a BPT deviation change amount large automatic stop signal, a BPT deviation great automatic stop signal, and a BPT deviation great tripping signal, although details will be offered later. If the BPT deviation change amount large automatic stop signal or the BPT deviation great automatic stop signal is outputted from the gas turbine protection apparatus 7, the amount of fuel supply to the combustors 4 is gradually decreased in the fuel supply system 6 to reduce load, thereby bringing the turbine body 2 to an automatic stop. If the BPT deviation great tripping signal is outputted from the gas turbine protection apparatus 7, the amount of fuel supply to the combustors 4 is instantaneously cut off in the fuel supply system 6 to trip (urgently stop) the turbine body 2.

The combustors 4 are arranged at equal intervals in a toroidal form. These combustors 4 mix fuel, supplied from the fuel supply system 6, with compressed air supplied from a compressor (not shown), and burn the mixture to produce a combustion gas. The combustion gas of each combustor 4 is introduced from the turbine blade inlets into the sites of the turbine blades 3a, 3b to flow through the sites of the turbine blades 3a, 3b, thereby rotating the turbine body 2. Then, the combustion gas of each combustor 4 is discharged from the turbine blade outlets, and the combustion gas temperature (BPT) at the turbine blade outlet is measured by each thermocouple 4.

The thermocouples 5 are arranged toroidally at equal intervals in correspondence with the positions of installation (positions in the circumferential direction) of the combustors 4, as shown in FIG. 1(b). The respective combustors 4 are assigned the numerals #1 to #14 for convenience of explanation. In this case, assume that the combustor 4 at the position corresponding to the thermocouple 5 numbered #1 becomes abnormal, for example. If the direction of rotation of the turbine body 2 is the direction of an arrow B, and the swirl angle is equivalent to 2.7 of the combustors, for example, a change in the combustion gas temperature (BPT) of the abnormal combustor 4 is reflected in the BPT measured value of the thermocouple 5 numbered #3 which is located at a position displaced by the equivalent of 2 of the combustors, and in the BPT measured value of the thermocouple 5 numbered #4 which is located at a position displaced by the equivalent of 3 of the combustors.

Figure 2:
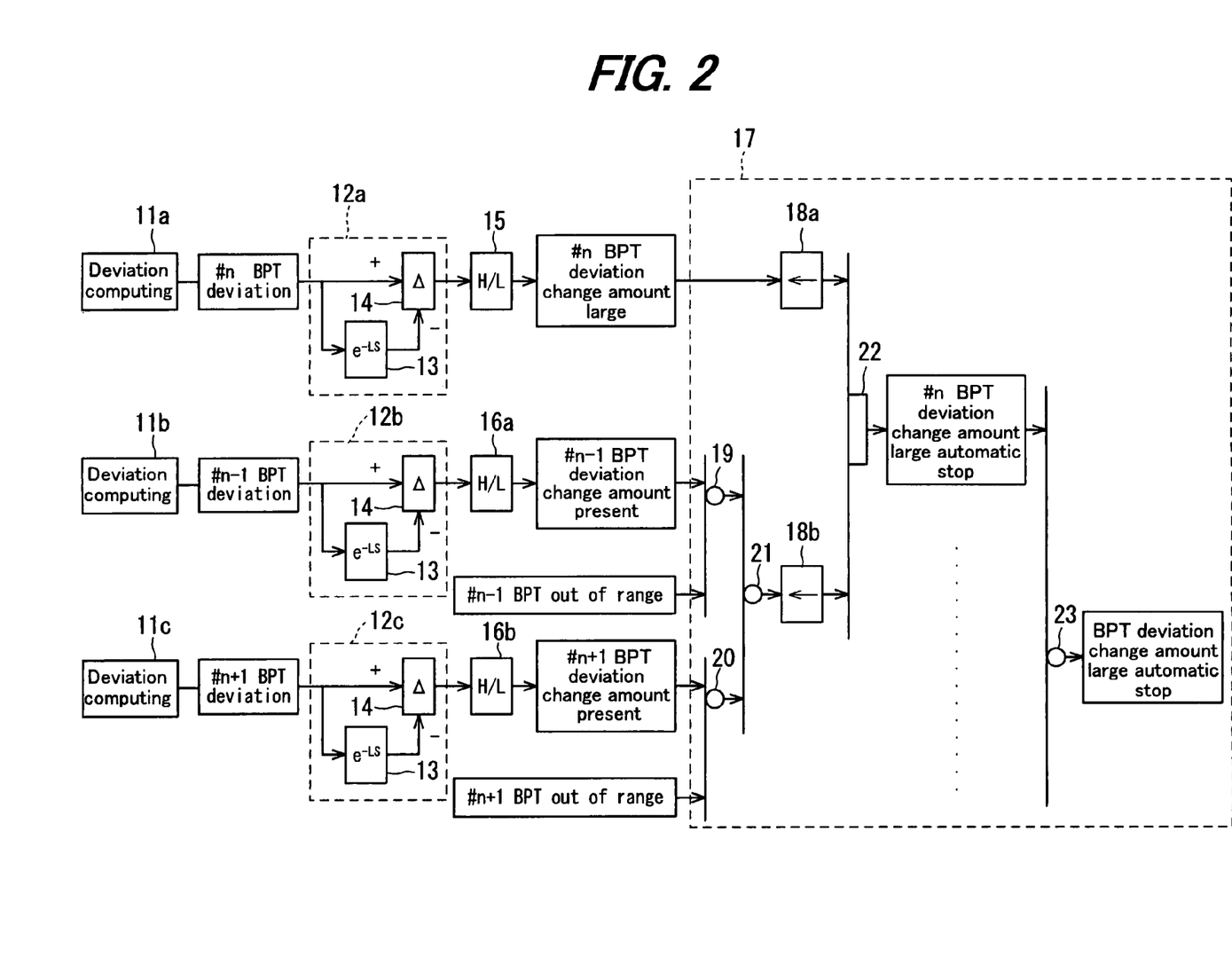
[FIG. 2] is an interlock logic diagram for "a blade pass temperature deviation change amount large" in the gas turbine protection apparatus.
Figure 3:
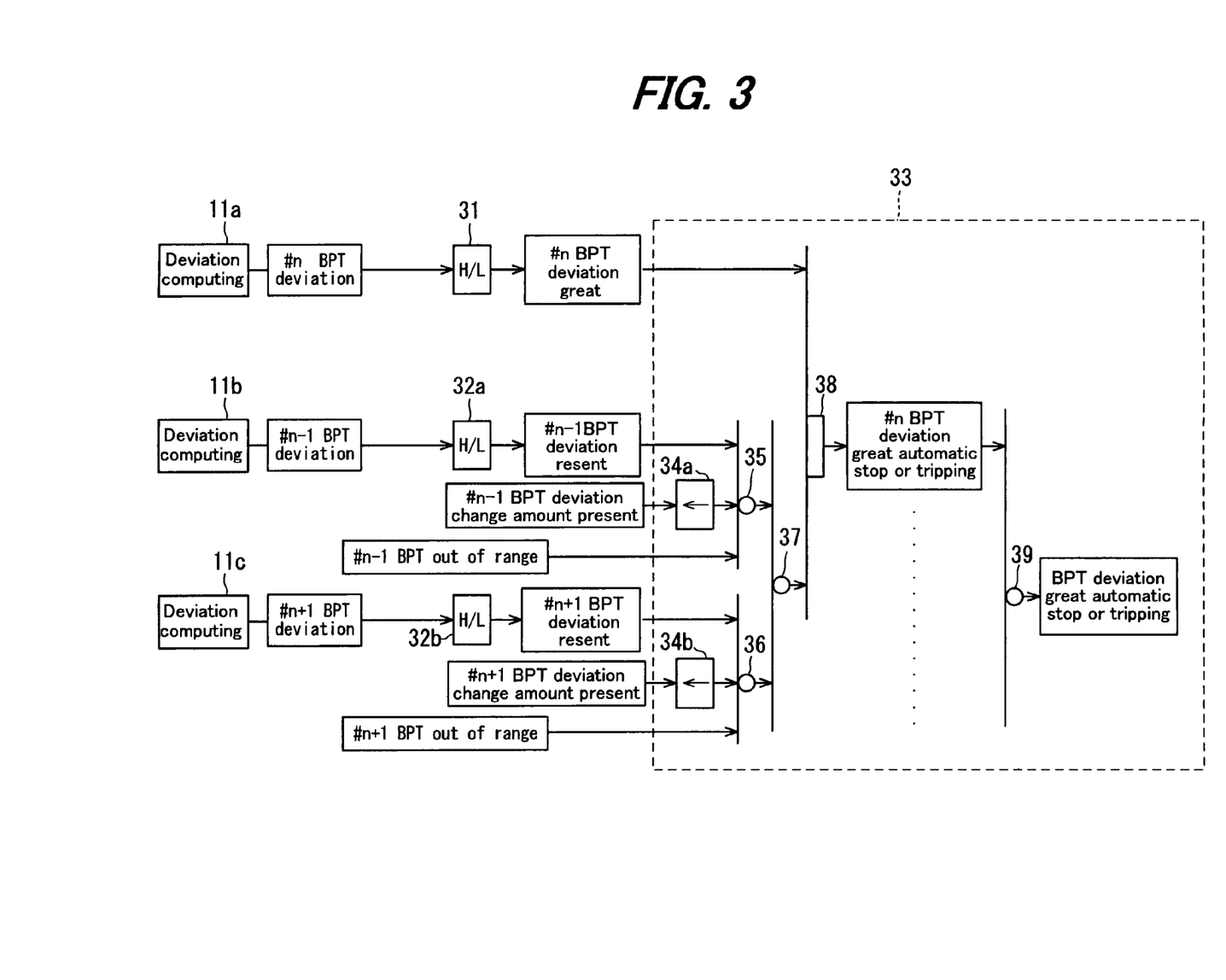
[FIG. 3] is an interlock logic diagram for "a blade pass temperature deviation great" in the gas turbine protection apparatus.

To prevent the malfunction of an interlock by making use of this fact, the gas turbine protection apparatus 7 has interlock logics as shown in FIGS. 2 and 3. The gas turbine protection apparatus 7 is furnished with a computer, and has, as the software of the computer, a BPT deviation change amount large interlock logic shown in FIG. 2 and a BPT deviation great interlock logic shown in FIG. 3. The interlock logics are not necessarily limited to the software, but may be composed of hardware.

The interlock logics shown in FIGS. 2 and 3 are provided for all of the thermocouples 5 (BPT measured values). In FIGS. 2 and 3, however, the interlock logics are illustrated for only one of the thermocouples 5 (BPT measured values), and are not shown for the other thermocouples 5. The symbol #n shown in FIGS. 2 and 3 refers to any of the thermocouples 5 numbered #1 to #14, while #n−1 and #n+1 refer to the thermocouples 5 adjacent bilaterally to the thermocouple 5 numbered #n. As shown in FIG. 1(b), if the thermocouple 4 marked #n is the thermocouple 5 numbered #3, for example, the thermocouples 5 of #n−1 and #n+1 are the thermocouples 5 of #2 and #4. If the thermocouple 4 marked #n is the thermocouple 5 numbered #14, for example, the thermocouples 5 of #n−1 and #n+1 are the thermocouples 5 of #13 and #1. If the thermocouple 4 marked #n is the thermocouple 5 numbered #1, for example, the thermocouples 5 of #n−1 and #n+1 are the thermocouples 5 of #14 and #2.

The BPT deviation change amount large interlock logic of FIG. 2 will be described. In the gas turbine protection apparatus 7, the difference between the average value of the BPT measured values of all the thermocouples 5 and the BPT measured value of the thermocouple 5 marked #n is computed at a temperature deviation computing section 11a to find the #n BPT deviation of the thermocouple 5 of #n. At a temperature deviation computing section 11b, the difference between the above average value and the BPT measured value of the thermocouple 5 marked #n−1 is computed to find the #n−1 BPT deviation of the thermocouple 5 of #n−1. At a temperature deviation computing section 11c, the difference between the above average value and the BPT measured value of the thermocouple 5 marked #n+1 is computed to find the #n+1 BPT deviation of the thermocouple 5 of #n+1.

Then, at a temperature deviation change amount computing section 12a, the #n BPT deviation change amount of the thermocouple 5 of #n is computed based on the #n BPT deviation computed at the temperature deviation computing section 11a. At a temperature deviation change amount computing section 12b, the #n−1 BPT deviation change amount of the thermocouple 5 of #n−1 is computed based on the #n−1 BPT deviation computed at the temperature deviation computing section 11b. At a temperature deviation change amount computing section 12c, the #n+1 BPT deviation change amount of the thermocouple 5 of #n+1 is computed based on the #n+1 BPT deviation computed at the temperature deviation computing section 11c.

The temperature deviation change amount computing sections 12a, 12b, 12c each have a dead time computing section 13 and a subtracting section 14. The symbol $e^{-Ls}$ shown in the dead time computing section 13 denotes the transfer function of a dead time element, L being a dead time, and s being a Laplace operator. In the temperature deviation change amount computing section 12a, the dead time computing section 13 sequentially stores the #n BPT deviation computed at the temperature deviation computing section 11a, and outputs it 1 minute later, and the subtracting section 14 computes the difference between the current #n BPT deviation computed at the temperature deviation computing section 11a and the #n BPT deviation outputted from the dead time computing section 13 (i.e., the #n BPT deviation 1 minute before now), and outputs the result of computation as a #n BPT deviation change amount. The temperature deviation change amount computing sections 12b, 12c also perform the same processing, as done at the temperature deviation change amount computing section 12a, for the #n−1 BPT deviation and the #n+1 BPT deviation computed at the temperature deviation computing sections 11b, 11c to compute a #n−1 BPT deviation change amount and a #n+1 BPT deviation change amount, followed by outputting them.

Then, at a temperature deviation change amount large determining section 15, the #n BPT deviation change amount of the thermocouple 5 of #n computed at the temperature deviation change amount computing section 12a is compared with a set value H or L for "BPT deviation change amount large", and a signal for "#n BPT deviation change amount large" is outputted when the #n BPT deviation change amount of the thermocouple 5 of #n exceeds the BPT deviation change amount large set value H or L.

Figure 4:
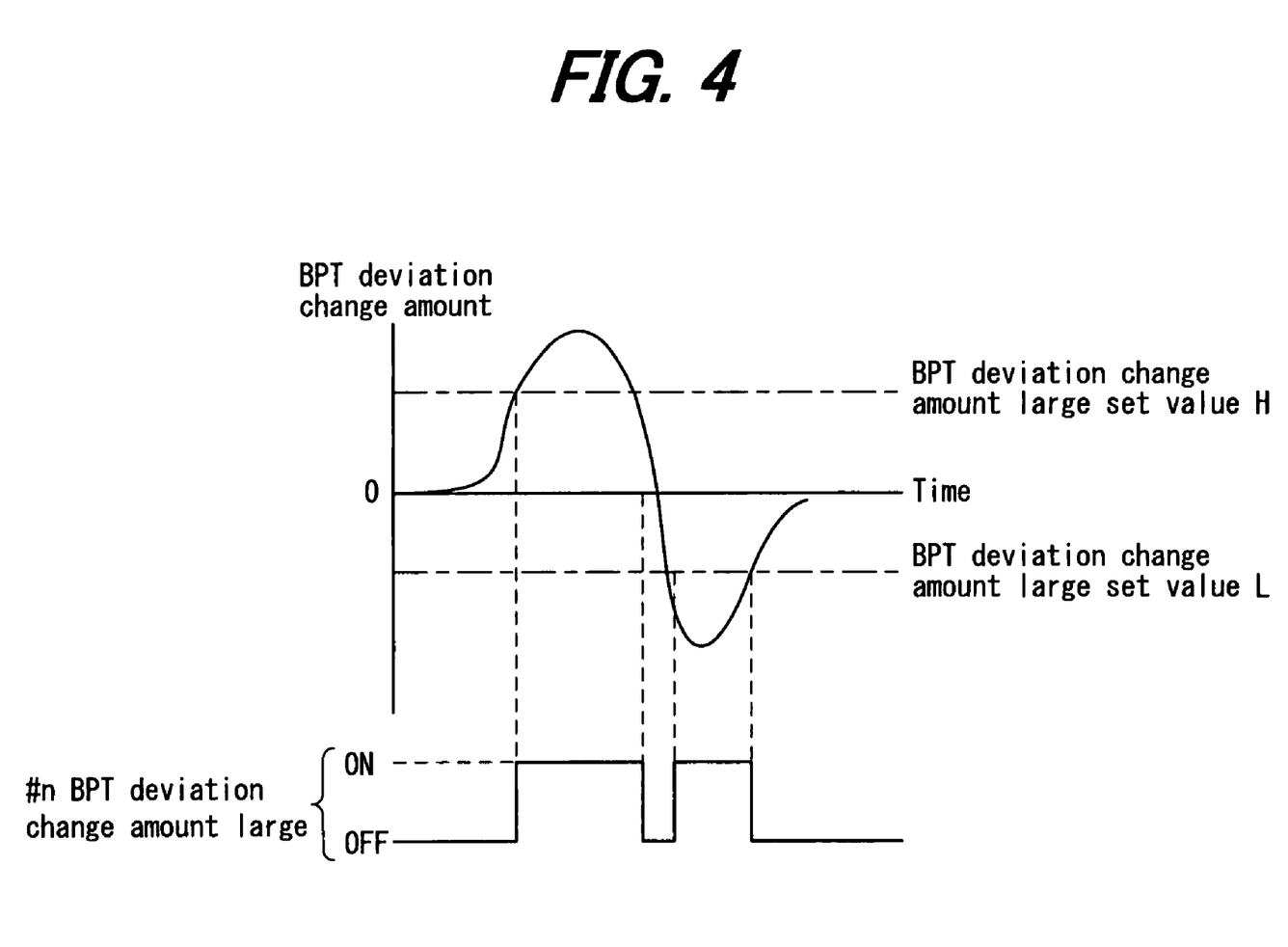
[FIG. 4] is an explanation drawing showing the relationship between a blade pass temperature deviation change amount and a blade pass temperature deviation change amount large set value.

That is, the BPT measured value may decrease or increase depending on an abnormality in the combustor 4 or an abnormality in the thermocouple 4. As shown in FIG. 4, therefore, the temperature deviation change amount large determining section 15 has the BPT deviation change amount large set value L on the decrease side and the BPT deviation change amount large set value H on the increase side. When the BPT measured value of the thermocouple 5 of #n increases, and the #n BPT deviation change amount exceeds the BPT deviation change amount large set value H, or when the BPT measured value decreases, and the #n BPT deviation change amount exceeds the BPT deviation change amount large set value L, the temperature deviation change amount large determining section 15 outputs the #n BPT deviation change amount large signal (turns it ON).

Then, as shown in FIG. 2, at a temperature deviation change amount present determining section 16a, the #n−1 BPT deviation change amount of the thermocouple 5 of #n−1 computed at the temperature deviation change amount computing section 12b is compared with a set value H or L for "BPT deviation change amount present", and a signal for "#n−1 BPT deviation change amount present" is outputted when the #n−1 BPT deviation change amount of the thermocouple 5 of #n−1 exceeds the BPT deviation change amount present set value H or L. Similarly, at a temperature deviation change amount present determining section 16b, the #n+1 BPT deviation change amount of the thermocouple 5 of #n+1 computed at the temperature deviation change amount computing section 12c is compared with a set value H or L for "BPT deviation change amount present", and a signal for "#n+1 BPT deviation change amount present" is outputted when the #n+1 BPT deviation change amount of the thermocouple 5 of #n+1 exceeds the BPT deviation change amount present set value H or L.

That is, the temperature deviation change amount present determining sections 16a, 16b also have the BPT deviation change amount present set value L on the decrease side and the BPT deviation change amount present set value H on the increase side in correspondence with a decrease and an increase in the BPT measured value. When the BPT measured value of the thermocouple 5 of #n−1 or #n+1 increases, and the #n−1 BPT deviation change amount or the #n+1 BPT deviation change amount exceeds the BPT deviation change amount present set value H, or when the BPT measured value decreases, and the #n−1 BPT deviation change amount or the #n+1 BPT deviation change amount exceeds the BPT deviation change amount present set value L, the temperature deviation change amount present determining section 16a or 16b outputs the #n−1 BPT deviation change amount present signal or the #n+1 BPT deviation change amount present signal (turns it ON). However, in order to prevent the BPT deviation change amount large interlock from becoming inoperative in case of an abnormality in the combustor 4, the BPT deviation change amount present set value H or L is set at a smaller value (smaller absolute value) than the BPT deviation change amount large set value H or L.

At a protection signal outputting section (logic section) 17, a BPT deviation change amount large automatic stop signal is outputted, as a gas turbine protection signal, when the #n BPT deviation change amount of the thermocouple 5 of #n exceeds the BPT deviation change amount large set value H or L, and the #n BPT deviation change amount large signal is outputted from the temperature deviation change amount large determining section 15, and when the BPT deviation change amount of one of the thermocouples 5 of #n−1 and #n+1 adjacent bilaterally to the thermocouple 5 of #n (i.e., the #n−1 BPT deviation change amount or the #n+1 BPT deviation change amount) exceeds the BPT deviation change amount present set value H or L, and the BPT deviation change amount present signal (i.e., the #n−1 BPT deviation change amount present signal or the #n+1 BPT deviation change amount present signal) is outputted from the temperature deviation change amount present determining section 16a or 16b.

The protection signal outputting section 17 also outputs the BPT deviation change amount large automatic stop signal when the #n BPT deviation change amount of the thermocouple 5 of #n exceeds the BPT deviation change amount large set value H or L, and the #n BPT deviation change amount large signal is outputted from the temperature deviation change amount large determining section 15, and when one of the thermocouples 5 of #n−1 and #n+1 adjacent bilaterally to the thermocouple 5 of #n has a value out of range (the BPT measured value of the thermocouple 5, for example, exceeds the measurement range of 0 to 800° C., becoming 0° C. or lower or 800° or higher) owing to an abnormality such as wire breakage. Furthermore, the protection signal outputting section 17 has off-delay timer sections 18a, 18b to prevent discrepancies between outputting timings for the #n BPT deviation change amount large signal, the #n−1 BPT deviation change amount present signal and the #n+1 BPT deviation change amount present signal.

In detail, the #n BPT deviation change amount large signal outputted from the temperature deviation change amount large determining section 15 is inputted into the off-delay timer section 18a. In the off-delay timer section 18a, even when the #n BPT deviation change amount large signal outputted from the temperature deviation change amount large determining section 15 becomes OFF, the ON-state of this #n BPT deviation change amount large signal is retained by a predetermined delay time $\Delta T1$. By this measure, the timing with which the #n BPT deviation change amount large signal becomes OFF is delayed by the time $\Delta T1$ (see FIG. 5; details to be offered later).

In an OR logic (logical sum) section 19, an output signal becomes ON when the #n−1 BPT deviation change amount present signal is outputted from the temperature deviation change amount present determining section 16a, or when the thermocouple 5 of #n−1 is judged to have a value out of range. In an OR logic section 20, an output signal becomes ON when the #n+1 BPT deviation change amount present signal is outputted from the temperature deviation change amount present determining section 16b, or when the thermocouple 5 of #n+1 is judged to have a value out of range. In an OR logic section 21, an output signal becomes ON when the output signal of the OR logic section 19 or the output signal of the OR logic section 20 is turned on. The output signal of the OR logic section 21 is inputted into the off-delay timer section 18b.

In the off-delay timer section 18b, even when the output of the OR logic section 21 becomes OFF, the ON-state of this output signal is retained by a predetermined delay time $\Delta T2$, whereby the timing with which this output signal becomes OFF is delayed by the time $\Delta T2$. That is, the timing with which the #n−1 BPT deviation change amount present signal and the #n+1 deviation change amount present signal become OFF can be delayed by the time $\Delta T2$ by means of the off-delay timer section 18b.

In an AND logic (logical product) section 22, a #n BPT deviation change amount large automatic stop signal is outputted (ON) when the output signal of the off-delay timer section 18a is ON, and when the output signal of the off-delay timer section 18b is ON. In regard to the thermocouple 5 other than the thermocouple 5 of #n, too, the BPT deviation change amount large automatic stop signal is outputted by the BPT deviation change amount large interlock logic similar to that for the thermocouple 5 of #n. In an OR logic section 23, the BPT deviation change amount large automatic stop signal is outputted when any of the BPT deviation change amount large automatic stop signals of the thermocouples 5 of #1 to #14 is outputted.

Figure 5:
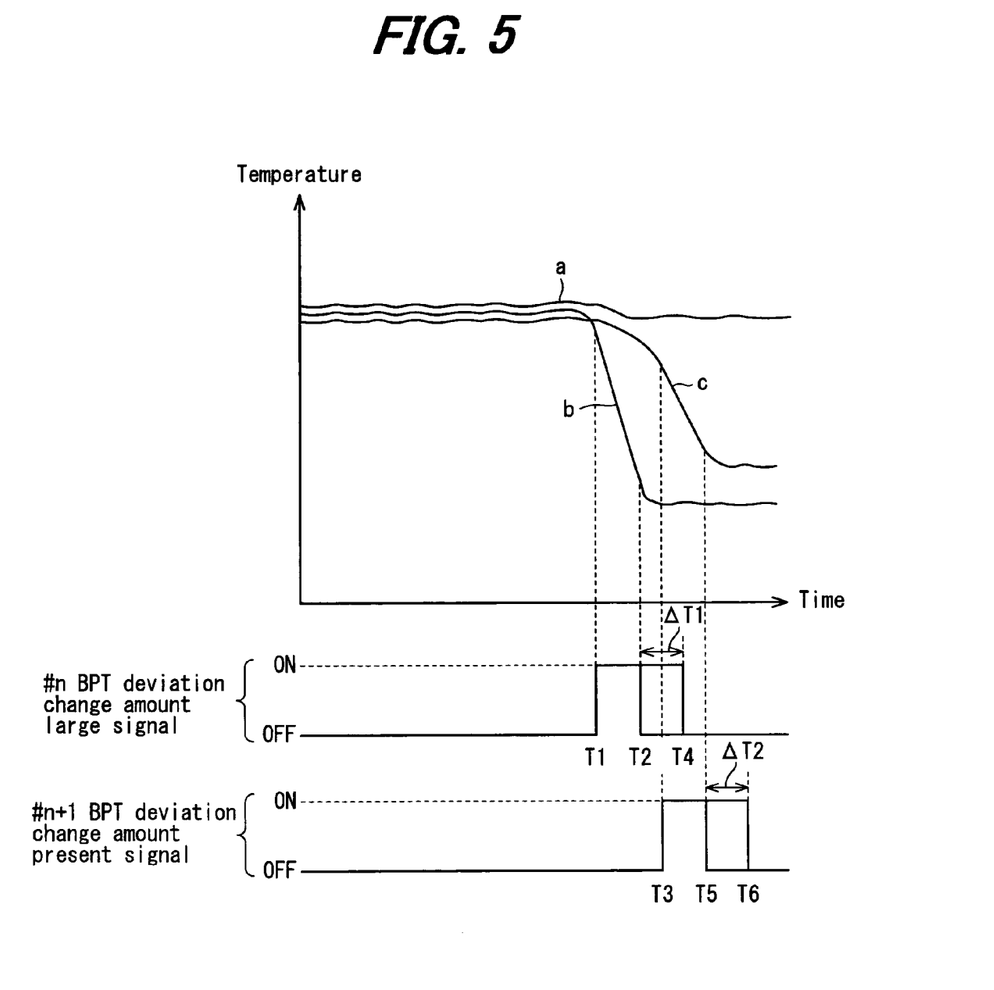
[FIG. 5] is an explanation drawing of the actions of the blade pass temperature deviation change amount large interlock logic.

The functions of the off-delay timer sections will be described further by way of an example based on FIG. 5. In FIG. 5, a denotes the average value of the BPT measured values of the thermocouples 5 of #1 to #14, b denotes the BPT measured value of the thermocouple 5 of #n, and c denotes the BPT measured value of the thermocouple 5 of #n+1.

If the BPT measured value b and the BPT measured value c decrease, as illustrated, as a result of a fall in the combustion gas temperature due to an abnormality in the combustor 4, the #n BPT deviation change amount large signal outputted from the temperature deviation change amount large determining section 15 becomes ON at a time T1 when the BPT measured value b begins to decrease and the #n BPT deviation change amount exceeds the BPT deviation change amount large set value L, and becomes OFF at a time T2 when the BPT measured value b does not decrease any more and the #n BPT deviation change amount does not exceed the BPT deviation change amount large set value L. On the other hand, the #n+1 BPT deviation change amount present signal outputted from the temperature deviation change amount present determining section 16b becomes ON at a time T3 when the BPT measured value c begins to decrease and the #n+1 BPT deviation change amount exceeds the BPT deviation change amount present set value L, and becomes OFF at a time T5 when the BPT measured value c does not decrease any more and the #n+1 BPT deviation change amount does not exceed the BPT deviation change amount present set value L.

In such cases, therefore, the #n BPT deviation change amount large signal and the #n+1 BPT deviation change amount present signal do not enter the ON-state at the same time. Thus, the #n BPT deviation change amount large automatic stop signal is not outputted, and the BPT deviation change amount large automatic stop signal is not outputted. As a result, the turbine body 2 cannot be protected. Hence, the #n BPT deviation change amount large signal is adapted to become OFF at a time T4 because of the delay of $\Delta T1$ provided by the off-delay timer section 18a. By so doing, the discrepancy between the timings of outputting both signals is prevented, whereby both signals are in the ON-state during the period of from T3 until T4. Consequently, the #n BPT deviation change amount large automatic stop signal is outputted, and the BPT deviation change amount large automatic stop signal is outputted.

The #n+1 BPT deviation change amount present signal is also adapted to become OFF at a time T6 because of the delay of $\Delta T2$ provided by the off-delay timer section 18b. This is because the discrepancy in the outputting timing is not limited to the illustrated example, but there may be a case where the #n+1 BPT deviation change amount present signal is outputted prior to the #n BPT deviation change amount large signal. That is, it is necessary to perform delaying treatment by the off-delay timer sections 18a, 18b for both of the #n BPT deviation change amount large signal and the #n+1 BPT deviation change amount present signal. The concrete values of the delay times ΔT1 and ΔT2 can be set, as appropriate, by tests, for example.

The BPT deviation change amount large interlock logic of FIG. 3 will be described. In the gas turbine protection apparatus 7, the difference between the average value of the BPT measured values of all the thermocouples 5 and the BPT measured value of the thermocouple 5 marked #n is computed at a temperature deviation computing section 11a to find the #n BPT deviation of the thermocouple 5 of #n. At a temperature deviation computing section 11b, the difference between the above average value and the BPT measured value of the thermocouple 5 marked #n−1 is computed to find the #n−1 BPT deviation of the thermocouple 5 of #n−1. At a temperature deviation computing section 11c, the difference between the above average value and the BPT measured value of the thermocouple 5 marked #n+1 is computed to find the #n+1 BPT deviation of the thermocouple 5 of #n+1.

Then, at a temperature deviation great determining section 31, the #n BPT deviation of the thermocouple 5 of #n computed at the temperature deviation computing section 11a is compared with a set value H or L for "BPT deviation change amount present", and a signal for "#n BPT deviation change amount large" is outputted when the #n BPT deviation of the thermocouple 5 of #n exceeds the BPT deviation change amount present set value H or L. The temperature deviation great determining section 31 has a BPT deviation great set value L on the decrease side and a BPT deviation great set value H on the increase side in accordance with an increase and a decrease in the BPT measured value. When the BPT measured value of the thermocouple 5 of #n increases, and the #n BPT deviation exceeds the BPT deviation great set value H, or when the BPT measured value decreases, and the #n BPT deviation exceeds the BPT deviation great set value L, the temperature deviation great determining section 31 outputs the #n BPT deviation signal (turns it ON).

Then, at a temperature deviation present determining section 32a, the #n−1 BPT deviation of the thermocouple 5 of #n−1 computed at the temperature deviation computing section 11b is compared with a set value H or L for "BPT deviation present", and a signal for "#n−1 BPT deviation present" is outputted when the #n−1 BPT deviation of the thermocouple 5 of #n−1 exceeds the BPT deviation present set value H or L. Similarly, at a temperature deviation present determining section 32b, the #n+1 BPT deviation of the thermocouple 5 of #n+1 computed at the temperature deviation computing section 11c is compared with a set value H or L for "BPT deviation present", and a signal for "#n+1 BPT deviation change amount present" is outputted when the #n+1 BPT deviation of the thermocouple 5 of #n+1 exceeds the BPT deviation present set value H or L.

The temperature deviation present determining sections 32a, 32b also have the BPT deviation present set value L on the decrease side and the BPT deviation present set value H on the increase side in correspondence with a decrease and an increase in the BPT measured value. When the BPT measured value of the thermocouple 5 of #n−1 or #n+1 increases, and the #n−1 BPT deviation or the #n+1 BPT deviation exceeds the BPT deviation present set value H, or when the BPT measured value decreases, and the #n−1 BPT deviation or the #n+1 BPT deviation exceeds the BPT deviation present set value L, the temperature deviation present determining section 32a or 32b outputs the #n−1 BPT deviation present signal or the #n+1 BPT deviation present signal (turns it ON). However, in order to prevent the BPT deviation great interlock from becoming inoperative in case of an abnormality in the combustor 4, the BPT deviation present set values H, L are set at smaller values (smaller absolute values) than the BPT deviation great set values H, L.

At a protection signal outputting section (logic section) 33, a signal for BPT deviation great automatic stop or tripping (see FIG. 6; details to be offered later) is outputted, as a gas turbine protection signal, when the #n BPT deviation of the thermocouple 5 of #n exceeds the BPT deviation great set value H or L, and the #n BPT deviation great signal is outputted from the temperature deviation great determining section 31, and when the BPT deviation of one of the thermocouples 5 of #n−1 and #n+1 adjacent bilaterally to the thermocouple 5 of #n (i.e., the #n−1 BPT deviation or the #n+1 BPT deviation) exceeds the BPT deviation present set value H or L, and the BPT deviation present signal (i.e., the #n−1 BPT deviation present signal or the #n+1 BPT deviation present signal) is outputted from the temperature deviation present determining section 32a or 32b.

The protection signal outputting section 33 also outputs the BPT deviation great automatic stop or tripping signal when the #n BPT deviation of the thermocouple 5 of #n exceeds the BPT deviation great set value H or L, and the #n BPT deviation great signal is outputted from the temperature deviation great determining section 31, and when one of the thermocouples 5 of #n−1 and #n+1 adjacent bilaterally to the thermocouple 5 of #n has a value out of range (the BPT measured value of the thermocouple 5, for example, exceeds the measurement range of 0 to 800° C., becoming 0° C. or lower or 800° or higher) owing to an abnormality such as wire breakage.

The protection signal outputting section 33 also outputs the above-mentioned BPT deviation great automatic stop or tripping signal, when the #n BPT deviation of the thermocouple 5 of #n exceeds the BPT deviation great set value H or L, and the #n BPT deviation great signal is outputted from the temperature deviation great determining section 31, and when the BPT deviation change amount of one of the thermocouples 5 of #n−1 and #n+1 adjacent bilaterally to the thermocouple 5 of #n (i.e., the #n−1 BPT deviation change amount or the #n−1 BPT deviation change amount) exceeds the BPT deviation change amount present set value H or L, and the BPT deviation change amount present signal (i.e., the #n−1 BPT deviation change amount present signal or the #n+1 BPT deviation change amount present signal) is outputted from the temperature deviation change amount present determining section 16a or 16b of FIG. 2. Furthermore, the protection signal outputting section 33 has off-delay timer sections 34a, 34b to prevent discrepancies between outputting timings for the #n−1 BPT deviation change amount present signal and the #n+1 BPT deviation change amount present signal with respect to the #n BPT deviation great signal.

In detail, as shown in FIG. 3, the #n−1 BPT deviation change amount present signal is inputted into the off-delay timer section 34a. In the off-delay timer section 34a, even when the #n−1 BPT deviation change amount present signal outputted from the temperature deviation change amount present determining section 16a becomes OFF, the ON-state of this #n−1 BPT deviation change amount present signal is retained by a predetermined delay time ΔT11. By this measure, the timing with which the #n−1 BPT deviation change amount present signal becomes OFF is delayed by the time ΔT11. The #n+1 BPT deviation change amount present signal is inputted into the off-delay timer section 34b. In the off-delay timer section 34b, even when the #n+1 BPT deviation change amount present signal outputted from the temperature deviation change amount present determining section 16b becomes OFF, the ON-state of this #n+1 BPT deviation change amount present signal is retained by a predetermined delay time ΔT12. By this measure, the timing with which the #n+1 BPT deviation change amount present signal becomes OFF is delayed by the time ΔT12. The concrete values of the delay times ΔT11, ΔT12 can be set, as appropriate, by conducting tests, for example.

In an OR logic section 35, an output signal becomes ON when the #n−1 BPT deviation present signal is outputted from the temperature deviation present determining section 32a, or when the output signal of the off-delay timer section 34a (i.e., the #n−1 BPT deviation change amount present signal) is ON, or when the thermocouple 5 of #n−1 is judged to have a value out of range. In an OR logic section 36, an output signal becomes ON when the #n+1 BPT deviation present signal is outputted from the temperature deviation present determining section 32b, or when the output signal of the off-delay timer section 34b (i.e., the #n+1 BPT deviation change amount present signal) is ON, or when the thermocouple 5 of #n+1 is judged to have a value out of range. In an OR logic section 37, an output signal becomes ON when the output signal of the OR logic section 35 is ON, or when the output signal of the OR logic section 36 is ON.

In an AND logic section 38, a #n BPT deviation great automatic stop or tripping signal is outputted (ON) when the #n BPT deviation great signal is outputted from the temperature deviation great determining section 31, and when the output signal of the OR logic section 37 is ON. In regard to the thermocouple 5 other than the thermocouple 5 of #n, too, the BPT deviation automatic stop or tripping signal is outputted by the BPT deviation great interlock logic similar to that for the thermocouple 5 of #n. In an OR logic section 39, the BPT deviation great automatic stop or tripping signal is outputted when any of the BPT deviation great automatic stop or tripping signals of the thermocouples 5 of #n to #14 is outputted.

Figure 6:
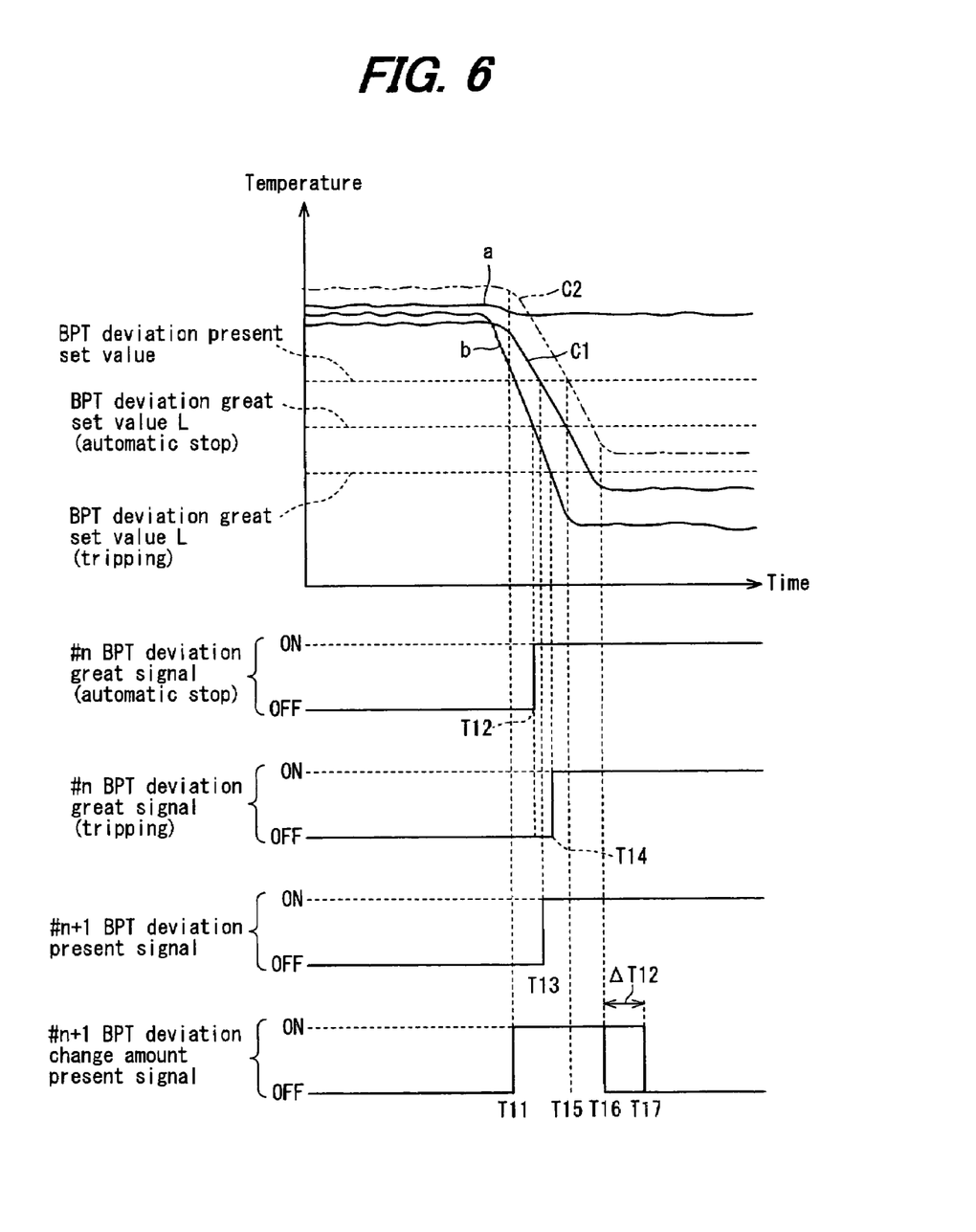
[FIG. 6] is an explanation drawing of the actions of the blade pass temperature deviation great interlock logic.

The differences between the BPT deviation great automatic stop signal and the BPT deviation great tripping signal, and so on, will be described based on FIG. 6 by way of a concrete example. In FIG. 6, a denotes the average value of the BPT measured values of the thermocouples 5 of #1 to #14, b denotes the BPT measured value of the thermocouple 5 of #n, and c1 and c2 denote the BPT measured values of the thermocouple 5 of #n+1 which are higher and lower than the average value a.

If the BPT measured value b decreases, as illustrated, as a result of a fall in the combustion gas temperature due to an abnormality in the combustor 4, the #n BPT deviation great signal outputted from the temperature deviation great determining section 31 becomes ON at a time T12 when the BPT measured value b decreases and the #n BPT deviation exceeds the BPT deviation great set value L for automatic stop. Namely, the #n BPT deviation great signal for automatic stop becomes ON. When the BPT measured value b further decreases and a time T14 is reached at which the #n BPT deviation exceeds the BPT deviation great set value L for tripping, the #n BPT deviation great signal for tripping becomes ON.

That is, the BPT deviation great set values H, L are each available as two values, i.e., a low value (absolute value) for automatic stop, and a high value (absolute value) for tripping. The BPT deviation great interlock logic shown in FIG. 3 is available in two forms, i.e., one on the BPT deviation set values H, L for automatic stop, and another on the BPT deviation set values H, L for tripping. The former interlock logic outputs a #n BPT deviation great automatic stop signal, and a BPT deviation great automatic stop signal. On the other hand, the latter interlock logic outputs a #n BPT deviation great tripping signal, and a BPT deviation great tripping signal. However, these interlock logics have the same logic configuration, so that only one interlock logic is illustrated for convenience of explanation in FIG. 3.

A further explanation will be offered for FIG. 6. When the BPT measured value c1 decreases as illustrated, the #n+1 BPT deviation present signal outputted from the temperature deviation present determining section 32b becomes ON at a time T13 when the BPT measured value c1 has decreased and the #n+1 BPT deviation exceeds the BPT deviation present set value L. At T13, therefore, the #n BPT deviation great signal for automatic stop and the #n+1 BPT deviation present signal become ON, so that the #n deviation great signal for automatic stop is outputted. At T14, the #n BPT deviation great signal for tripping and the #n+1 BPT deviation present signal become ON, so that the #n deviation great signal for tripping is outputted.

If the measured value of the thermocouple 5 of #n+1 is higher than the average value a as is c2, for example, it takes time until the BPT measured value c2 decreases and the #n+1 BPT deviation exceeds the BPT deviation present set value L (#n+1 BPT deviation present signal become ON) (time T15). With these measures alone, therefore, the outputting of the #n BPT deviation great automatic stop signal or the #n BPT deviation great tripping signal is retarded. By contrast, the #n+1 BPT deviation change amount present signal becomes ON at the time T11 when the BPT measured value c2 has decreased, and the #n+1 BPT deviation change amount exceeds the BPT deviation change amount present set value L. Hence, the #n BPT deviation great automatic stop signal or the #n BPT deviation great tripping signal can be outputted at an early stage.

Furthermore, the point in time at which the #n+1 deviation change amount present signal becomes OFF is not a time T16 when the BPT measured value c2 has not decreased, and the #n+1 BPT deviation change amount does not exceed the BPT deviation change amount present set value L any more, but is delayed by a delay time ΔT12 until a time T17 by means of the off-delay timer section 34b. Hence, even if the #n+1 BPT deviation change amount does not exceed the BPT deviation change amount present set value L a little ahead of T14, for example, the ON-state of the #n+1 BPT deviation change amount present signal can be maintained until after T14. Consequently, the #n BPT deviation great tripping signal can be outputted reliably at T14.

According to the gas turbine protection apparatus of the present embodiment, as describe above, the BPT deviation change amount large automatic stop signal is outputted when the BPT deviation change amount of any of the thermocouples 5 exceeds the BPT deviation change amount large set value H or L, and the BPT deviation change amount large signal is outputted from the temperature deviation change amount large determining section 15, and when the BPT deviation change amount of any of the thermocouples 5 adjacent bilaterally to the any thermocouple 5 exceeds the BPT deviation change amount present set value H or L, and the BPT deviation change amount present signal is outputted from the temperature deviation change amount present determining section 16a or 16b. Thus, if the thermocouple 5 becomes abnormal, accidental outputting of the BPT deviation change amount large automatic stop signal can be prevented without the need to increase the thermocouples 5. Only when the combustor 4 becomes abnormal, the BPT deviation change amount large automatic stop signal can be outputted to protect the turbine body 2. Hence, the gas turbine 1 can be operated stably.

According to the gas turbine protection apparatus of the present embodiment, there are provided the off-delay timer section 18a for delaying the time when the BPT deviation change amount large signal outputted from the temperature deviation change amount large determining section 15 becomes OFF, and the off-delay timer section 18b for delaying the time when the BPT deviation change amount present signal outputted from the temperature deviation change amount present determining section 16a or 16b becomes OFF. Thus, a discrepancy between the outputting timings for the BPT deviation change amount large signal and the BPT deviation change amount present signal can be prevented by the off-delay timer sections 18a, 18b, so that the BPT deviation change amount large automatic stop signal can be outputted reliably.

According to the gas turbine protection apparatus of the present embodiment, the BPT deviation change amount large automatic stop signal is also outputted when the BPT deviation change amount of any of the thermocouples 5 exceeds the BPT deviation change amount large set value H or L, and the BPT deviation change amount large signal is outputted from the temperature deviation change amount large determining section 15, and when any of the thermocouples 5 adjacent bilaterally to the any thermocouple 5 has a value out of range. Thus, the gas turbine protection signal can also be outputted when the thermocouples 5 on both sides become so abnormal as to have values out of range, rendering determination impossible.

According to the gas turbine protection apparatus of the present embodiment, the BPT deviation great automatic stop or tripping signal is outputted when the BPT deviation of any of the thermocouples 5 exceeds the BPT deviation great set values H, L, and the BPT deviation great signal is outputted from the temperature deviation great determining section 31, and when the BPT deviation of any of the thermocouples 5 adjacent bilaterally to the any thermocouple 5 exceeds the BPT deviation present set value H or L, and the BPT deviation present signal is outputted from the temperature deviation present determining section 32a or 32b. Thus, if the thermocouple 5 becomes abnormal, accidental outputting of the BPT deviation great automatic stop or tripping signal can be prevented without the need to increase the thermocouples 5. Only when the combustor 4 becomes abnormal, the BPT deviation great automatic stop or tripping signal can be outputted to protect the turbine body 2. Hence, the gas turbine 1 can be operated stably.

According to the gas turbine protection apparatus of the present embodiment, the BPT deviation great automatic stop or tripping signal is also outputted when the BPT deviation of any of the thermocouples 5 exceeds the BPT deviation great set value H or L, and the BPT deviation great signal is outputted from the temperature deviation great determining section 31, and when the BPT deviation change amount of any of the thermocouples 5 adjacent bilaterally to the any thermocouple 5 exceeds the BPT deviation change amount present set value H or L, and the BPT deviation change amount present signal is outputted from the temperature deviation change amount present determining section 32a or 32b. Thus, even when the BPT measured values of the thermocouples 5 located bilaterally adjacently are higher than the average value, the BPT deviation great automatic stop or tripping signal can be outputted at an early stage.

According to the gas turbine protection apparatus of the present embodiment, there are the off-delay timer sections 34a, 34b for delaying the times when the BPT deviation change amount present signals outputted from the temperature deviation change amount present determining sections 16a, 16b become OFF. Thus, these off-delay timer sections 34a, 34b can prevent the discrepancy in the outputting timing for the BPT deviation change amount present signal with respect to the BPT deviation great signal, so that the BPT deviation great automatic stop or tripping signal can be outputted reliably.

According to the gas turbine protection apparatus of the present embodiment, the BPT deviation great automatic stop or tripping signal is also outputted when the BPT deviation of any of the thermocouples 5 exceeds the BPT deviation great set value H or L, and the BPT deviation great signal is outputted from the temperature deviation great determining section 31, and when any of the thermocouples 5 adjacent bilaterally to the any thermocouple 5 has a value out of range. Thus, the BPT deviation great automatic stop or tripping signal can also be outputted when the thermocouples 5 on both sides become so abnormal as to have values out of range, rendering determination impossible.

The present invention is not necessarily limited to the use of the thermocouples for BPT measurement, but can also be applied to the use of other types of temperature sensors for BPT measurement. However, it is effective for the present invention to be applied to temperature sensors, such as thermocouples, which may be subject to shaving of the protective tube or faulty insulation as well as out-of-range values, whereby measured values may change abnormally within the measurement range, namely, temperature sensors having a possibility to cause an abnormality which is difficult to judge as an abnormality.

INDUSTRIAL APPLICABILITY

The present invention relates to a gas turbine protection apparatus. This apparatus is useful when applied in preventing a malfunction due to an abnormality in a temperature sensor, and outputting a gas turbine protection signal only when a combustor is abnormal, thereby protecting a turbine body reliably.

The invention claimed is:

1. A gas turbine protection apparatus which measures blade pass temperatures of combustion gases of a plurality of combustors arranged toroidally by temperature sensors at least equal in number to the number of the combustors and arranged toroidally at turbine blade outlets, and which outputs a gas turbine protection signal based on the blade pass temperature measured values of the temperature sensors, and comprising:

a temperature deviation computing section for computing a difference between an average value of the blade pass temperature measured values and the blade pass temperature measured value of each temperature sensor to find a blade pass temperature deviation of each temperature sensor;

a temperature deviation change amount computing section for computing a blade pass temperature deviation change amount of each temperature sensor based on the blade pass temperature deviation of each temperature sensor computed by the temperature deviation computing section;

a temperature deviation change amount large determining section for comparing the blade pass temperature deviation change amount of each temperature sensor computed by the temperature deviation change amount computing section with a blade pass temperature deviation change amount large set value to output a blade pass temperature deviation change amount large signal when the blade pass temperature deviation change amount of each temperature sensor exceeds the blade pass temperature deviation change amount large set value;

a temperature deviation change amount present determining section for comparing the blade pass temperature deviation change amount of each temperature sensor computed by the temperature deviation change amount computing section with a blade pass temperature deviation change amount present set value smaller than the blade pass temperature deviation change amount large set value to output a blade pass temperature deviation change amount present signal when the blade pass temperature deviation change amount of each temperature sensor exceeds the blade pass temperature deviation change amount present set value; and a protection signal outputting section for outputting the gas turbine protection signal when the blade pass temperature deviation change amount of any of the temperature sensors exceeds the blade pass temperature deviation change amount large set value, and the blade pass temperature deviation change amount large signal is outputted from the temperature deviation change amount large determining section, and when the blade pass temperature deviation change amount of any of the temperature sensors adjacent bilaterally to the any temperature sensor exceeds the blade pass temperature deviation change amount present set value, and the blade pass temperature deviation change amount present signal is outputted from the temperature deviation change amount present determining section.

2. The gas turbine protection apparatus according to claim 1, characterized in that the protection signal outputting section includes a first off-delay timer section for delaying a time when the blade pass temperature deviation change amount large signal outputted from the temperature deviation change amount large determining section becomes OFF, and a second off-delay timer section for delaying a time when the blade pass temperature deviation change amount present signal outputted from the temperature deviation change amount present determining section becomes OFF.

3. The gas turbine protection apparatus according to claim 1, characterized in that the protection signal outputting section also outputs the gas turbine protection signal when the blade pass temperature deviation change amount of any of the temperature sensors exceeds the blade pass temperature deviation change amount large set value, and the blade pass temperature deviation change amount large signal is outputted from the temperature deviation change amount large determining section, and when any of the temperature sensors adjacent bilaterally to the any temperature sensor has a value out of range.

4. A gas turbine protection apparatus which measures blade pass temperatures of combustion gases of a plurality of combustors arranged toroidally by temperature sensors at least equal in number to the number of the combustors and arranged toroidally at turbine blade outlets, and which outputs a gas turbine protection signal based on the blade pass temperature measured values of the temperature sensors, and comprising:

a temperature deviation computing section for computing a difference between an average value of the blade pass temperature measured values and the blade pass temperature measured value of each temperature sensor to find a blade pass temperature deviation of each temperature sensor;

a temperature deviation great determining section for comparing the blade pass temperature deviation of each temperature sensor computed by the temperature deviation computing section with a blade pass temperature deviation great set value to output a blade pass temperature deviation great signal when the blade pass temperature deviation of each temperature sensor exceeds the blade pass temperature deviation great set value;

a temperature deviation present determining section for comparing the blade pass temperature deviation of each temperature sensor computed by the temperature deviation computing section with a blade pass temperature deviation present set value smaller than the blade pass temperature deviation great set value to output a blade pass temperature deviation present signal when the blade pass temperature deviation of each temperature sensor exceeds the blade pass temperature deviation present set value; and a protection signal outputting section for outputting the gas turbine protection signal when the blade pass temperature deviation of any of the temperature sensors exceeds the blade pass temperature deviation great set value, and the blade pass temperature deviation great signal is outputted from the temperature deviation great determining section, and when the blade pass temperature deviation of any of the temperature sensors adjacent bilaterally to the any temperature sensor exceeds the blade pass temperature deviation present set value, and the blade pass temperature deviation present signal is outputted from the temperature deviation present determining section.

5. The gas turbine protection apparatus according to claim 4, further comprising a temperature deviation change amount computing section for computing a blade pass temperature deviation change amount of each temperature sensor based on the blade pass temperature deviation computed by the temperature deviation computing section, and a temperature deviation change amount present determining section for comparing the blade pass temperature deviation change amount of each temperature sensor computed by the temperature deviation change amount computing section with a blade pass temperature deviation change amount present set value to output a blade pass temperature deviation change amount present signal when the blade pass temperature deviation change amount of each temperature sensor exceeds the blade pass temperature deviation change amount present set value, and characterized in that the protection signal outputting section also outputs the gas turbine protection signal when the blade pass temperature deviation of any of the temperature sensors exceeds the blade pass temperature deviation great set value, and the blade pass temperature deviation great signal is outputted from the temperature deviation great determining section, and when the blade pass temperature deviation change amount of any of the temperature sensors adjacent bilaterally to the any temperature sensor exceeds the blade pass temperature deviation change amount present set value, and the blade pass temperature deviation change amount present signal is outputted from the temperature deviation change amount present determining section.

6. The gas turbine protection apparatus according to claim 4, characterized in that
the protection signal outputting section includes an off-delay timer section for delaying a time when the blade pass temperature deviation change amount present signal outputted from the temperature deviation change amount present determining section becomes OFF.

7. The gas turbine protection apparatus according to claim 4, characterized in that
the protection signal outputting section also outputs the gas turbine protection signal when the blade pass temperature deviation of any of the temperature sensors exceeds the blade pass temperature deviation great set value, and the blade pass temperature deviation great signal is outputted from the temperature deviation great determining section, and when any of the temperature sensors adjacent bilaterally to the any temperature sensor has a value out of range.

8. The gas turbine protection apparatus according to claim 2, characterized in that
the protection signal outputting section also outputs the gas turbine protection signal when the blade pass temperature deviation change amount of any of the temperature sensors exceeds the blade pass temperature deviation change amount large set value, and the blade pass temperature deviation change amount large signal is outputted from the temperature deviation change amount large determining section, and when any of the temperature sensors adjacent bilaterally to the any temperature sensor has a value out of range.

9. The gas turbine protection apparatus according to claim 5, characterized in that
the protection signal outputting section includes an off-delay timer section for delaying a time when the blade pass temperature deviation change amount present signal outputted from the temperature deviation change amount present determining section becomes OFF.

10. The gas turbine protection apparatus according to claim 5, characterized in that
the protection signal outputting section also outputs the gas turbine protection signal when the blade pass temperature deviation of any of the temperature sensors exceeds the blade pass temperature deviation great set value, and the blade pass temperature deviation great signal is outputted from the temperature deviation great determining section, and when any of the temperature sensors adjacent bilaterally to the any temperature sensor has a value out of range.

11. The gas turbine protection apparatus according to claim 6, characterized in that
the protection signal outputting section also outputs the gas turbine protection signal when the blade pass temperature deviation of any of the temperature sensors exceeds the blade pass temperature deviation great set value, and the blade pass temperature deviation great signal is outputted from the temperature deviation great determining section, and when any of the temperature sensors adjacent bilaterally to the any temperature sensor has a value out of range.

* * * * *